United States Patent [19]
Rohani

[11] Patent Number: 5,999,522
[45] Date of Patent: Dec. 7, 1999

[54] METHOD AND APPARATUS FOR DETERMINING HAND-OFF CANDIDATES IN A COMMUNICATION SYSTEM

[75] Inventor: Kamyar Rohani, Grapevine, Tex.

[73] Assignee: Motorola, Inc., Schaumburg, Ill.

[21] Appl. No.: 08/978,559

[22] Filed: Nov. 26, 1997

[51] Int. Cl.[6] .................................................... H04Q 7/00
[52] U.S. Cl. ......................... 370/331; 370/332; 455/436
[58] Field of Search .................................. 370/331, 332, 370/335, 342; 455/436, 437, 439, 441, 446, 561, 442

[56] References Cited

U.S. PATENT DOCUMENTS

| | | | |
|---|---|---|---|
| 5,508,708 | 4/1996 | Ghosh et al. | |
| 5,548,812 | 8/1996 | Padovani et al. | 455/69 |
| 5,577,022 | 11/1996 | Padovgni et al. | 375/208 |
| 5,594,718 | 1/1997 | Weaver, Jr. et al. | 370/331 |
| 5,625,876 | 4/1997 | Gilhousen et al. | 375/347 |
| 5,792,072 | 2/1998 | Crichton et al. | 455/437 |
| 5,849,785 | 12/1998 | Widley | 370/332 |

OTHER PUBLICATIONS

Joint Technical Committee, PN–3384, JTC(AIR)/94.10.31–022R6, Proposed CDMA PCS Standard; date Oct. 31, 1994; pp. 3–102, and 2–221 to 2–234.

CDMA Network Engineering Handbook, Chapter 9, Search and Hnadoff Parameters.

Soft Handoff Pilot Detection; TR45.5.3.4/94.01.10.03; GTE labaratories Incorporated, Jan. 10, 1994.

Performance of Power–Controlled Wideband Terrestrial Digital Communication; IEEE Transactions on Communications; vol. 41, No. 4, Apr. 1993, pp. 559–569, by Andrew Viterbi, et al.

*Primary Examiner*—Ajit Patel
*Attorney, Agent, or Firm*—Hossein Beladi; Mario J. Donato, Jr.

[57] ABSTRACT

A communication system provides wireless communication in a coverage area and includes a base station (100) and a mobile station (290). The base station (100) has a plurality of sectors (210, 220, 230, 240, 250, 260) where a corresponding plurality of pilot signals (212, 222, 232, 242, 252, 262) are transmitted. A sector (210) transmits a forward link signal (211) for communicating to the mobile station (290). The mobile station (290) transmits a reverse link signal (215) and a message signal including a list of a plurality of candidate sectors for a soft hand-off routine. A method and apparatus of determining the candidate list includes measuring reverse link signal (215) which are received at said plurality of sectors. Then, comparing reverse link signal level received at sector (210) to the reverse link signal levels received at all other sectors of said plurality of sectors (210, 220, 230, 240, 250, 260). Finally, the candidate list is determined according to a result of comparing the reverse link signal levels.

15 Claims, 3 Drawing Sheets

STEP 110

STEP 120

STEP 130

METHOD AND APPARATUS FOR DETERMINING HAND-OFF CANDIDATES IN A COMMUNICATION SYSTEM

FIELD OF THE INVENTION

The present invention relates to cellular communication systems, and more particularly, to a method and apparatus for determining base station candidates for a hand-off in a communication system.

BACKGROUND OF THE INVENTION

Hand-off is a process by which a network of base stations and a mobile station maintain their communication when the mobile station travels from one coverage area to another. Generally, the coverage areas in a communication system are pre-defined by the geographical locations of its base stations, or may be defined in combination with the call loading level of base stations. Each coverage area is defined as a cell which is normally served by a base station. Furthermore, each cell is divided into several sectors such that each sector provides wireless communication in a coverage area. Very often, a hand-off is between two sectors of the same cell. In a code division multiple access (CDMA) communication system, two types of hand-off procedures are supported, namely: hard hand-off, and soft hand-off. The hand-off between two sectors of the same cell is performed by a soft hand-off routine. The communication link during a soft hand-off is transferred to a carrier which has the same frequency as the carrier frequency currently in progress. As a result, a mobile station which has commenced a soft hand-off would not disrupt its present communication link during the hand-off process. In hard handoff, the communication link which is currently in progress is disrupted for hand-off to a different carrier frequency.

In CDMA systems, a pilot channel on a specific code channel is transmitted from each base station. If a cell is divided into sectors, a pilot channel is also assigned to each sector. Typically, a cell has three to six sectors. Among other uses, the pilot channels are used to direct the mobile stations hand-off routines. Once a mobile station is moved into a coverage area, a list of all cells and sectors that are in the communication system is transmitted to the mobile station. The list contains a list of pilot signals of many cells and sectors. The mobile station constantly is searching for pilot signals of the cells and sectors that are in the list. The mobile station measures the strength of pilot signals which then are used as a criteria to create a list of possible candidate pilot signals for future hand-off. Since the list of all pilot signals is typically very long, the mobile station spends a long time scanning for all pilot signals, and in the process, consumes battery power. A long list also reduces the scan rate which results in hand-off delay. Moreover, scanning for a long list of pilot signals usually requires a complex search engine; and the search engine complexity further increases the mobile station battery power consumption. In the prior art, the mobile station limits the number of pilot signals that it scans to conserve its battery power. As a result, a limited candidate list of pilot signals is created.

The mobile station handoff process is initiated by transmitting a message to the base station which contains the list of candidate pilot signals. In CDMA system protocol, this message is called: Pilot Strength Measurement Message. The candidate pilot signals are ordered according to a priority which is generally based on the likelihood of success of completing the hand-off routine. Once the candidate list is transmitted to the base station, the base station subsequently responds back in a message, Hand-off Direction Message, to the mobile station with a direction for initiating the hand-off. Upon completion of the hand-off, the mobile station transmits a message, Hand-off Completion Message, indicating a successful completion of the hand-off process.

If a selected pilot candidate fails to complete the hand-off process during a hand-off routine, the communication system would resort to other pilot candidates in the pilot candidate list which were received in Pilot Strength Measurement Message. Since a limited candidate list is acquired, the list of pilot signals may be exhausted before the hand-off routine is successfully completed. In the case of soft hand-off process, the hand-off routine should be completed within a period of time such that the call is not interrupted and undue delay is prevented. If the list is exhausted before the hand-off process is completed, the mobile station performs either an unplanned termination of the call or tries to create a new list of candidates by searching for other pilot signals which further delays the hand-off process. In either case, the result is highly undesirable.

Therefore, there is a need for an improved method and apparatus of creating a list of pilot signal candidates for a soft hand-off routine.

DETAILED DESCRIPTION OF THE PREFERRED EMBODIMENT(S)

Figure 1:
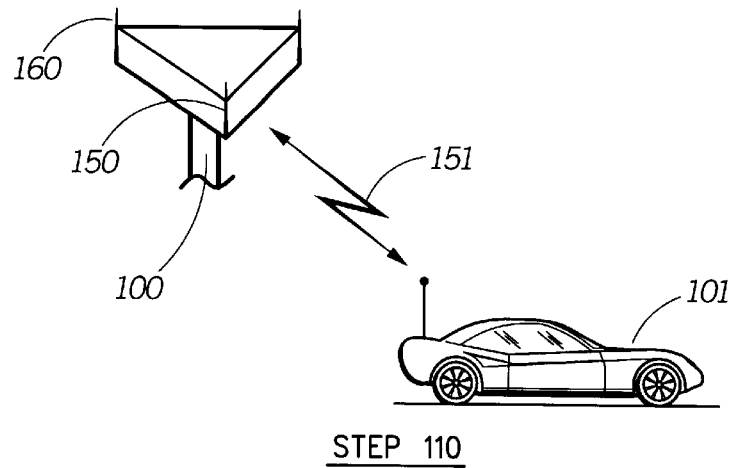
FIG. 1 depicts various steps of a hand-off routine between two sectors of the same cell in a communication system.
Figure 1:
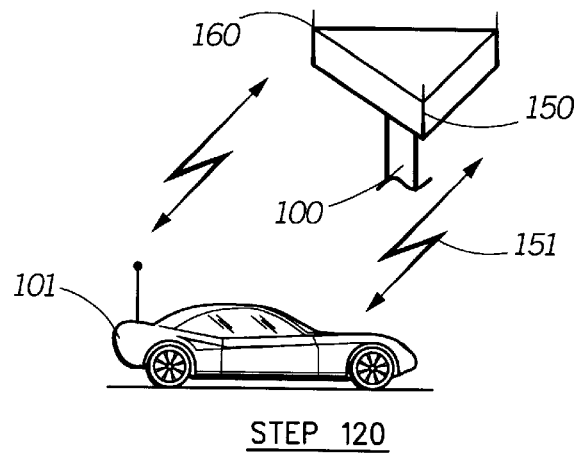
Figure 1:
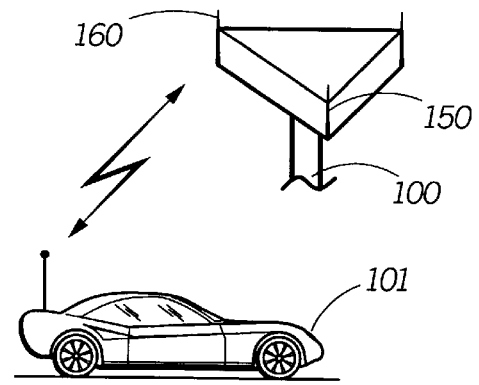

A code division multiple access (CDMA) communication system provides wireless communication in a coverage area and includes at least a base station and a mobile station. The base station has a plurality of sectors. Each sector provides wireless communication for a coverage area. Each sector transmits a pilot signal for directing a hand-off routine to or from the sector. When the mobile station is in communication with one of the sectors, a forward link signal is transmitted from that sector to the mobile station. The mobile station transmits a reverse link signal to maintain a two way communication link. The reverse link signal normally is received at its strongest level at the sector which is transmitting the forward link signal. Additionally, it may also be received by other sectors at a lower signal level. The mobile station also transmits a message which includes a list of candidate pilot signals for a possible soft hand-off. According to one aspect of the present invention, a method of determining the candidate list includes measuring reverse link signal level received at each sector. Then, comparing reverse link signal level received at the sector that is transmitting the forward link signal to the reverse link signal levels received at all other sectors. Finally, determining the candidate list according to a result of the comparing step. Since the candidate list is compiled autonomously by the a unit other the mobile station, it eliminates the need for the mobile station to measure the pilot signal of every sectors in that base station. This would allow the mobile station to conserve its battery power and to reduce its complexity.

More particularly, in a code division multiple access communication system, the Pilot Strength Measurement Message which is transmitted by a mobile station contains four sets of candidate lists. The sets are ordered in a predetermined priority. The first priority set is called the Active Set. The base station candidates listed in the Active Set have already a forward traffic channel assigned to the mobile station. The second highest priority set is the Candidate Set. The candidate list in the Candidate Set are those cells and sectors which their pilot signals have been received by the mobile station with sufficient strength to indicate that an associated forward link will successfully be demodulated. The third highest priority set is the Neighbor Set. The candidate list in the Neighbor Set are those cells and sectors that the strength of their pilot signals indicated that the associated traffic channel is likely to be demodulated. The list in the Neighbor Set excludes the candidates lists in the Active and Candidate Sets. The fourth or the last priority set is the Remaining Set. The Remaining Set contains a list of all possible pilots in the communication system, excluding the lists contained in the Active, Candidate and Neighbor Sets.

A mobile station acquires more accurate results when it spends more time gathering the information from the pilot signals. However, the mobile stations generally have a budgeted power consumption that prevents them from spending long periods of time in gathering the pilot channels information. Moreover, a CDMA communication system has many cells and sectors each having an associated pilot channel. To create a complete list of candidates for each set of the candidates, the mobile station may need to spend a very long time scanning for every pilot channel in the communication system. To solve the problem, in the prior art, the communication system operators, while complying with the CDMA system protocol, have limited the Pilot Strength Measurement Message to contain only the Active and Candidate Sets information. As a result, the mobile station is creating a limited, and very often, inadequate sets of pilot channels information. In response to this problem, according to another aspect of the present invention, the base station autonomously determines the sector candidates of the same cell in the Candidate Set according to the reverse link signal levels received at its various sectors, thereby eliminating the need for a mobile station to scan the pilot signal of every sector.

With reference to FIG. 1, a mobile station 101 performs three steps, 110, 120 and 130, in a routine of making a hand-off from sector 150 to 160 in base station 100. The steps 10, 120 and 130 are initial, process, and completion steps respectively. In the initial step 110, the mobile station 101 transmits a Pilot Strength Measurement Message 151 to sector 150 which contains information about Active, Candidate, Neighbor, and Remaining Sets of pilot candidates for the process of hand-off. In the process step 120, the candidate list in each set in the order of priority of sets are used to complete the hand-off. Once the sector 160 is selected, at the completion step 130, the sector 150 and mobile station 101 terminate the communication link 151, and mobile station 101 continues the communication with the sector 160 through link 161. In the process step 120, if the candidate list in one set is exhausted before the hand-off is completed, a new candidate in the next lower priority set is moved up to a higher priority set to be used for possible hand-off.

Figure 2:
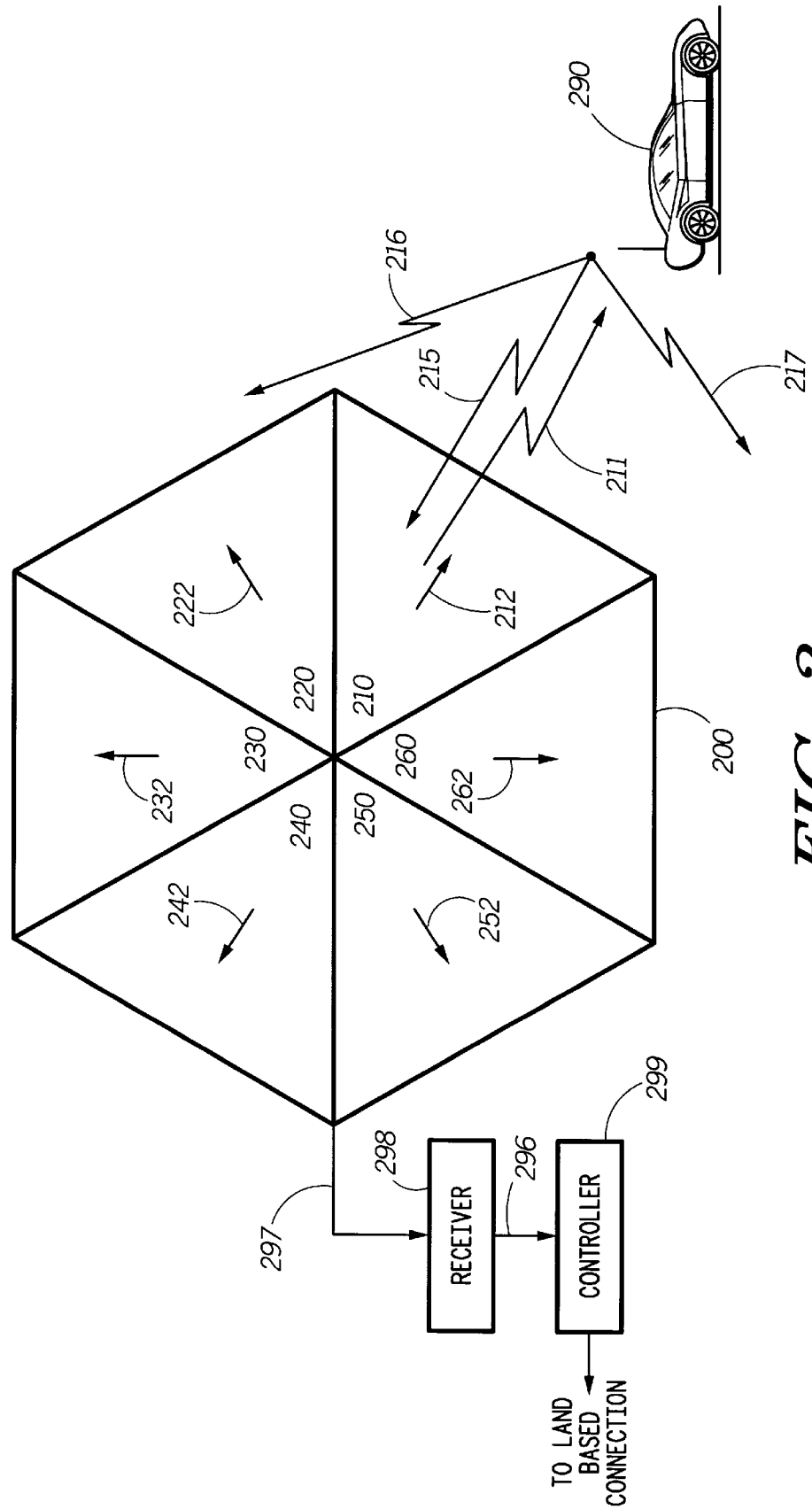
FIG. 2 depicts sector configuration of a cell and associated receiver and controller where a mobile station is in communication with the base station through forward and reverse link signals.

With reference to FIG. 2, a cell 200 configuration of a code division multiple access communication system is shown to contain six sectors 210, 220, 230, 240, 250 and 260. The cell 200 is served by one base station receiving signals from all sectors. Such a receiver is shown at 298. Also, the cell 200 is controlled by a controller 299 which may control all sectors. Each sector transmits at least one pilot signal. Pilot signals 212, 222, 232, 242, 252 and 262 are shown. An initial list of all pilot signals is transmitted to a mobile station 290. The mobile station 290 is shown to be in communication with sector 210. The forward link 211 is transmitted to the mobile station 290. A reverse link 215 is transmitted back by the mobile station 290 to maintain a two way communication link. However, the reverse link signal 215 propagates in every direction. Therefore, some its power may be received at sectors other than the one which is in forward link communication with the mobile station 290. Those signals are shown, for example, as signals 216 and 217. The signal 216 may be received at sector 220. Therefore, the receiver 298 in addition to receiving signal 215 at sector 210 also receives signal 216 at sector 220. Similarly, signal 217 may be received by other sectors such as 260.

The mobile station 290, according to the prior art, would have to scan all the pilot signals, 212, 222, 232, 242, 252 and 262, to create the candidate list. According to one aspect of the present invention, the base station controller 299 determines the Candidate Set which may includes other sectors. The list in the candidate set includes sector 220 when the signal 216 power level is within a predetermined level of signal 215. Typically, the difference between signals 215 and 216 should be in the range of 6–dB to include sector 220 in the candidate list; however, the present invention is not limited to 6–dB range. If signal 216 is received at sector 220 at much lower signal level, the probability that sector 220 is a good candidate for hand-off is very low, and thus, it should not be included in the candidate list. Therefore, a candidate list for hand-off is created without requiring the mobile station to scan for all pilot signals, thus, conserving its battery power. The receiver 298 measures signal strength of all the reverse link signals received at various sectors of the base station and compares their relative levels for including any of the sectors in the candidate list. The operation and design of the receiver 298 is well known in the art.

The signal 216 measured at sector 220 may experience amplitude fluctuation due to the mobile station traveling at high speed. As a result, an instantaneous power measurement of the signal 216 may produce an erroneous result. In response, according to another aspect of the present invention, when the speed of the mobile station is high, an average power of signal 216 is measured and compared to the reverse link signal 215 power level to determine whether the sector 220 should be included in the hand-off candidate list. When the speed of the mobile station is high such that the signal 216 level is crossing an average level repeatedly over a short period of time, the average signal level measurement is made over such a similar short period of time. Generally, the averaging window is reasonably short even for the cases of slow moving mobile stations. However, when the speed of the mobile station 290 is very low, the average signal level measurement may take a long time. Most base stations have dual antenna diversity which therefore allows reducing the averaging window in all cases.

The process of adding a candidate to the candidate list is followed by a process of dropping other candidates that are already included in the list, if the included candidates are at or below a drop-threshold. A candidate is added to the list when the received reverse link signal level is below a predetermined level of the reverse link signal received at the sector in forward communication with the mobile station.

This predetermined signal level difference is called add-threshold. Accordingly, if the received reverse link signal level is within this limit, the sector is added to the candidate list. To drop a candidate from the list, the received reverse link signal level should have at least a difference equal to a predetermined drop-threshold level. The drop-threshold level is larger than add-threshold level. Therefore, a hysteresis in signal level difference as a result of signal propagation in the environment would not create an unstable candidate list.

Figure 3:
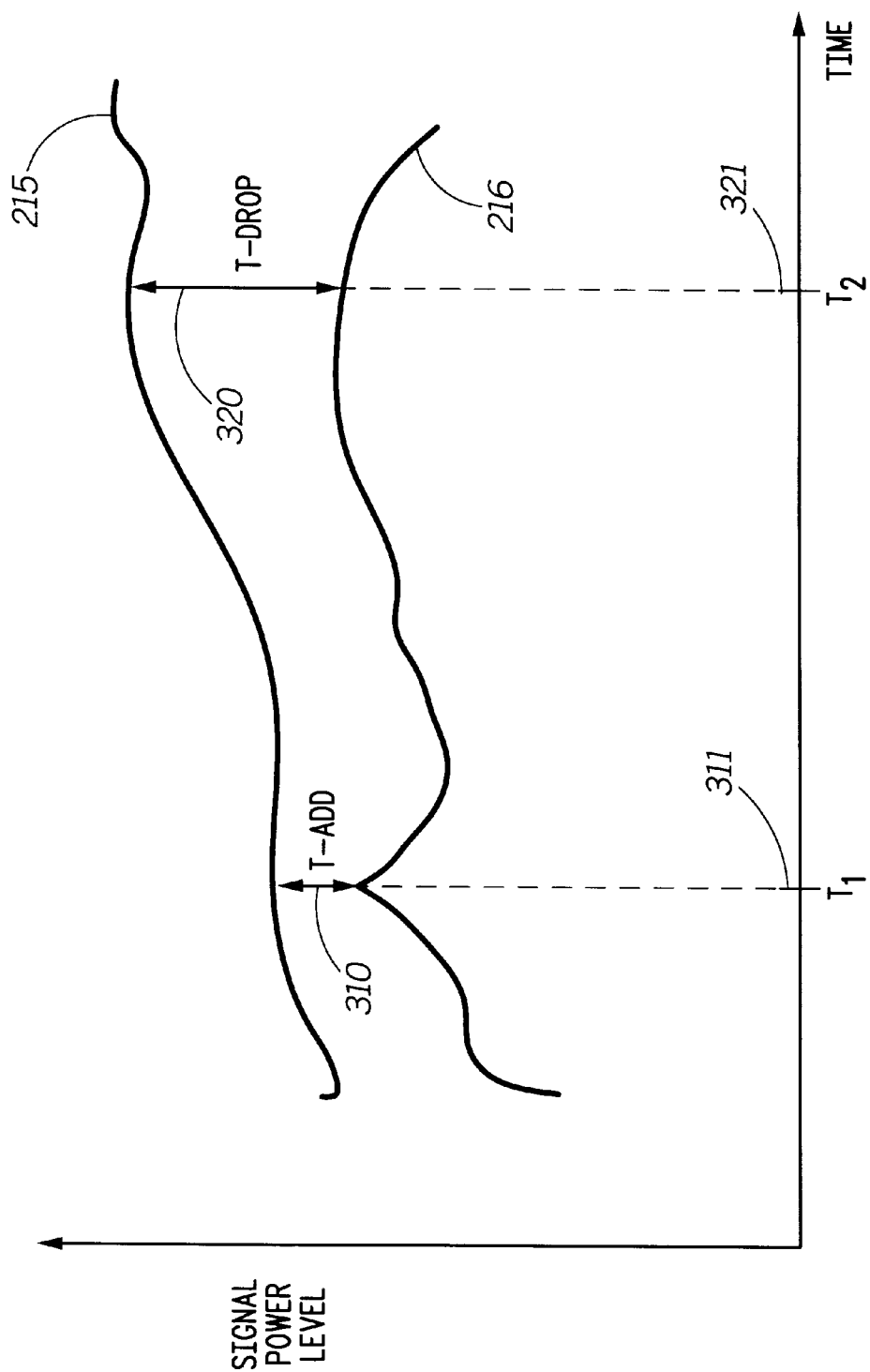
FIG. 3 depicts an example of reverse link signals and their relative amplitudes with respect to time received at various sectors of the base station.

With reference to FIG. 3, a typical signal level characteristic of signals 215 and 216 with respect to time are shown. An add-threshold 310 and a drop-threshold 320 are shown for an example. At time T1, 311, signals 215 and 216 are within the add-threshold level 310. Therefore, sector 220 which is receiving signal 216 is added to the candidate list. The difference between signals 215 and 216 between the times 311 and 321 has dropped below add-threshold 310, the sector 220 which is receiving signal 216 is not dropped from the candidate list between those times. At time T2, 321, signals 215 and 216 exceeds drop-threshold 320. Therefore, sector 220 at time T2, 321, is dropped from the candidate list.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

I claim:

1. A method of determining a list of hand-off candidates in a communication system providing wireless communication in a coverage area, the communication system including a base station having a plurality of sectors, said base station transmitting a forward link signal adapted to communicate with a mobile station, said mobile station transmitting a reverse link signal and a message signal including said list of a plurality of hand-off candidate sectors, the method comprising the steps of:

measuring a plurality of reverse link signal levels received at said plurality of sectors;

comparing one of said plurality of reverse link signal levels received at a sector which is transmitting said forward link signal to reverse link signal levels received at all other sectors of said plurality of sectors; and determining said list of said plurality of hand-off candidate sectors based on the step of comparing.

2. The method as recited in claim 1 wherein said message signal is a Pilot Strength Measurement Message signal.

3. The method as recited in claim 2 wherein said Pilot Strength Measurement Message signal includes a Candidate Set including said list of said plurality of hand-off candidate sectors.

4. The method as recited in claim 1 wherein said communication system is a code division multiple access communication system.

5. The method as recited in claim 1 wherein said step of comparing said reverse link signal levels comprises comparing to determine levels of said reverse signals to be within a predetermined level of said reverse link signal level received at said sector which is transmitting said forward link signal.

6. The method as recited in claim 5 wherein said step of comparing to determine levels of said reverse signals said candidate list have reverse link signal levels within said predetermined level.

7. The method as recited in claim 6 wherein said predetermined level is at a level below said reverse signal level received at said sector which is transmitting said forward link signal.

8. The method as recited in claim 6 wherein said candidate list includes any of the plurality of sectors which according to said comparing step has received said reverse link signal within an add-threshold level.

9. The method as recited in claim 8 wherein said candidate list excludes any of the already included sectors which according to said comparing step has received said reverse link signal within a drop-threshold level.

10. The method as recited in claim 9 wherein said add-threshold level is unequal to said drop-threshold level.

11. The method as recited in claim 10 wherein said add-threshold level is less than said drop-threshold level.

12. The method as recited in claim 1 further including the step of determining a speed of said mobile station, and said candidate list is determined according to said result of said comparing step and said step of determining said speed.

13. The method as recited in claim 1 wherein said step of measuring reverse signal level further comprises the step of measuring an average reverse signal level.

14. The method as recited in claim 13 wherein said average measurement is made over a time window according to a speed of said mobile station.

15. A communication system providing wireless communication in a coverage area, comprising:

a base station having a plurality of sectors;

a mobile station receiving a forward link signal from said base station, and transmitting a reverse link signal to said base station and a message signal including a list of a plurality of candidate sectors for a soft hand-off routine;

means for measuring reverse link signal levels received at said plurality of sectors;

means for comparing a measured reverse link signal level received at a sector which is transmitting said forward link signal to measure said reverse link signal levels received at all other sectors of said plurality of sectors; and a controller for determining said list of candidate sectors according to a result of said comparing means.

* * * * *